March 28, 1933.  F. A. LATHE  1,902,869
ROTATABLE TURRET CAMERA BACK FOR EXPOSING
LIGHT SENSITIVE PHOTOGRAPHIC PLATES
Filed Aug. 26, 1931  2 Sheets-Sheet 1

INVENTOR:
F. A. Lathe

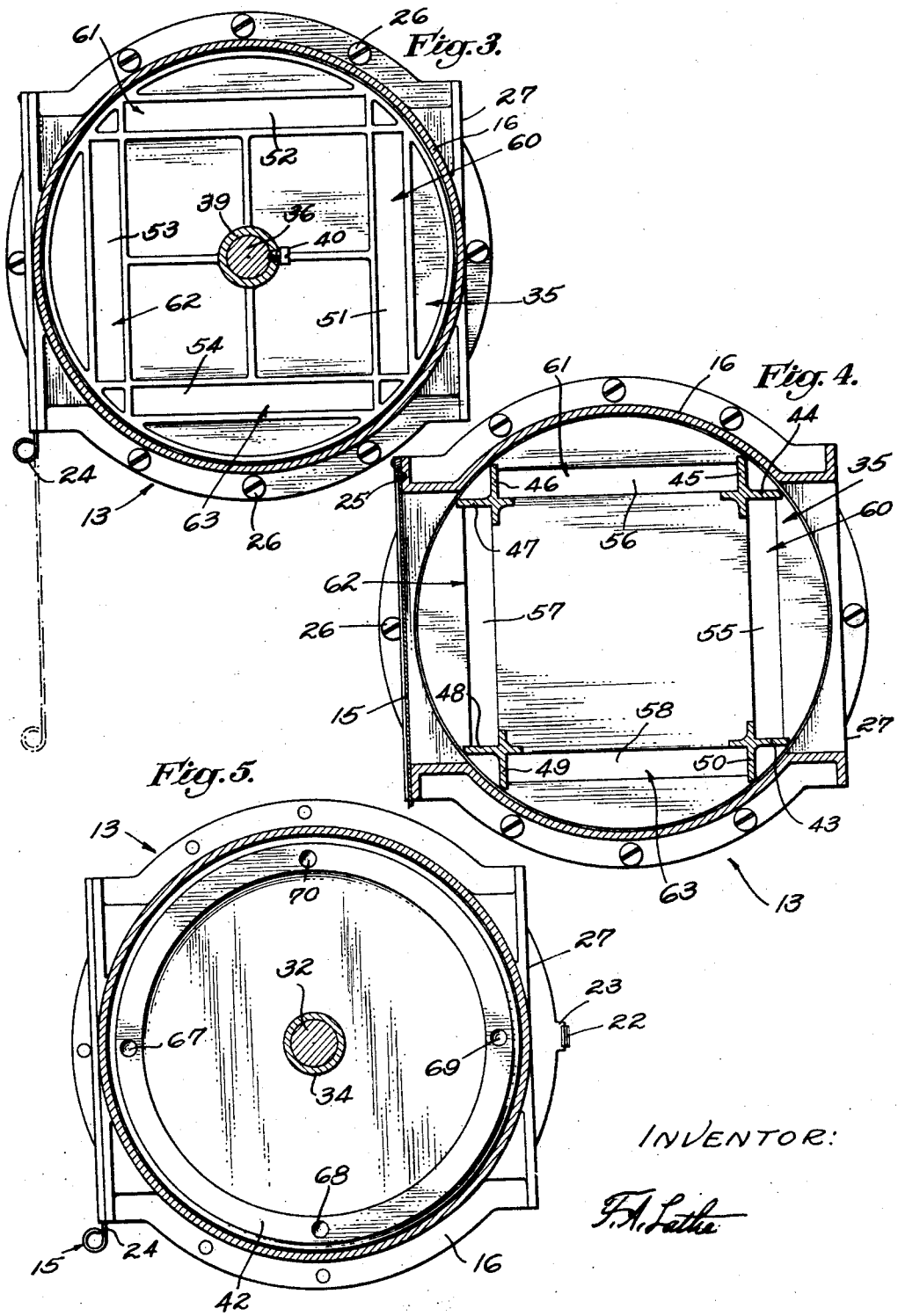

Patented Mar. 28, 1933

1,902,869

UNITED STATES PATENT OFFICE

FRED A. LATHE, OF OAKLAND, CALIFORNIA, ASSIGNOR TO GABRIEL MOULIN, OF SAN FRANCISCO, CALIFORNIA

ROTATABLE TURRET CAMERA BACK FOR EXPOSING LIGHT SENSITIVE PHOTOGRAPHIC PLATES

Application filed August 26, 1931. Serial No. 559,439.

My invention relates to the art of taking successive exposures, and by means of a camera equipped with my rotatable turret camera back, successive exposures may be rapidly and conveniently made, without any danger of disturbing the focus of the camera on the object.

One of the objects of my invention is to produce a rotatable turret camera back which when attached to a camera provides a quick, expedient, and efficient means of producing successive exposures.

Another object of my invention is to produce a rotatable turret camera back by means of which color separation negatives may be quickly and efficiently obtained.

The rotatable turret camera back of my invention may be attached to any kind of a camera, for example, a studio, view, aeroplane, or graflex camera; and is adapted to be either manually or mechanically rotated.

The rotatable turret may be built to hold two or more special or standard plate or film holders. It is so constructed that it will stop at exact points when rotated so that the negatives produced thereby will be in exact registry.

I will now describe one form of my invention in detail and for the sake of illustration, I will describe a rotatable turret camera back provided with four plate holder receiving openings in connection with a studio camera.

Other and further objects of my invention will be apparent from the disclosures in the specification and the accompanying drawings.

Figure 3 is a section taken on the line 3—3 of Fig. 2.

Figure 4 is a section taken on the line 4—4 of Fig. 2.

Figure 5 is a section taken on the line 5—5 of Fig. 2.

Figure 1:
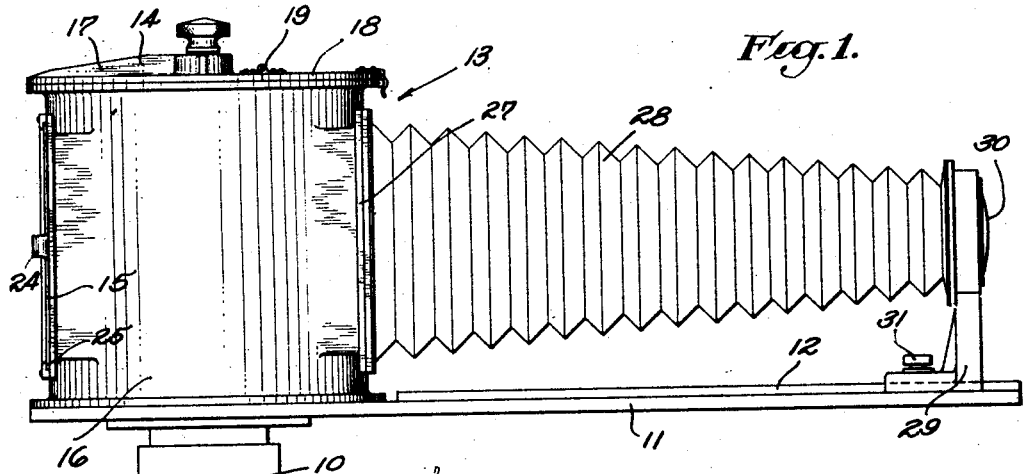
Figure 1 is a utility view of the rotatable turret camera back of my invention.

In the drawings the numeral 10 designates a tripod upon which is mounted a supporting member 11. Mounted on said supporting member 11 is guide bar 12 and a turret housing 13. The turret housing 13 consists of a top member 14, a removable member 15 and the main portion 16. A portion of the top member 14 is adapted to be opened and said member may therefore be conveniently made in two parts 17 and 18 respectively, said parts being connected together by means of a hinge 19. Part 17 of member 14 is connected to main portion 16 by means of screws 20. In order to insure a light tight connection between part 18 of member 14 and main portion 16 when said 14 is in the position shown in Figure 1, a piece of felt 21 or other suitable material is provided between said members 16 and 18, and said member 18 is provided with a snap lock 22 which is adapted to engage a protrusion 23 of said member 16.

The removable member 15 is provided with a gripping means 24. Said member 15 is adapted to slide in a tightfitting groove 25, and forms a light tight connection when in place as shown in the drawings.

The main portion 16 of the turret housing 13 is connected to the supporting member 11 by means of screws 26.

The end 27 of turret housing 13 opposite the removable member 15 is open and is connected to bellows 28. The other end of said bellows 28 is connected to a lens support 29. Mounted on said lens support 29 is a lens 30. The lens support 29 is mounted on guide bar 12, and is adapted to move longitudinally on said guide bar. The lens support 29 is provided with a setscrew 31 which is adapted to engage the guide bar 12 when tightened.

A shaft 32 is mounted in lower portion of turret housing 13. The upper portion of said shaft is mounted in an opening formed in a shoulder 34 of rotatable turret 35.

Figure 2:
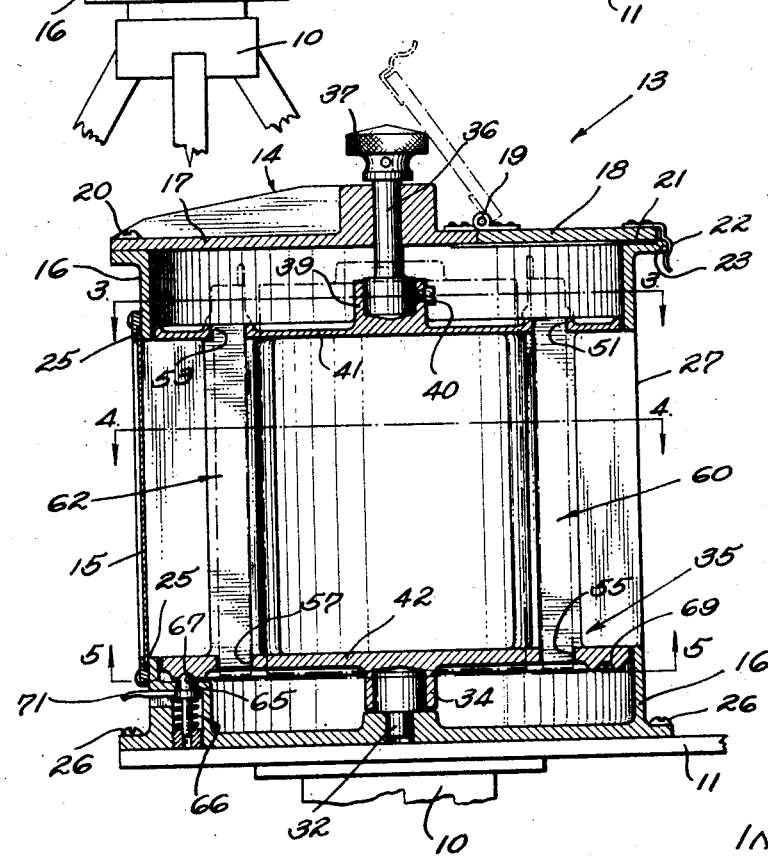
Figure 2 is a section of the rotatable turret camera back taken on a medial plane of Figure 1.

A shaft 36 is mounted on the upper portion of turret housing 13. The upper portion of said shaft is provided with a thumb knob 37. The lower portion of said shaft is mounted in an opening formed in a shoulder 39 of rotatable turret 35. The shaft 36 is held in fixed relationship with said rotatable turret by means of set screw 40 as shown in Figs. 2 and 3. The rotatable turret is therefore rotated by rotating the thumb knob 37.

The rotatable turret 35 consists of an upper member 41, a lower member 42 and bars 43, 44, 45, 46, 47, 48, 49, and 50. Upper member 42 is provided with hollow shoulder 39 and openings 51, 52, 53, and 54. Lower member 42 is provided with hollow shoulder 34 and openings 55, 56, 57, and 58. Plate holder receiving opening 60 is formed by opening 51, bars 43 and 44 and opening 55. Plate holder receiving opening 61 is formed by opening 52, bars 45 and 46 and opening 56. Plate holder receiving opening 62 is formed by opening 53, bars 47 and 48, and opening 57. Plate holder receiving opening 63 is formed by opening 54, bars 49 and 50 and opening 58. Plate holder receiving openings 60, 61, 62, and 63 are adapted to receive standard plate holders.

The rotatable turret 35 is adapted to be stopped whenever one of said plate holder receiving openings 60, 61, 62, or 63 is in a plane parallel to that of the opening 27, and therefore in a plane parallel to that of the lens 30. This is accomplished by providing the turret housing 13 with a ball 65 mounted on a strong spring 66, which ball is adapted to engage the recessions 67, 68, 69, and 70 provided for it in the bottom of lower member 42. The recessions 67, 68, 69, and 70 are spaced around the periphery of member 42 and are spaced in a plane midway between the ends of plate holder receiving openings 60, 61, 62, and 63 respectively. The turret housing 13 is also provided with a lever 71 which is adapted to depress the spring 66 thereby allowing the ball 65 to recede from said recessions and the turret 35 to rotate when the thumb knob 37 is rotated. The spring 66 is so strong, however, that unless the lever 71 is operated to depress it, it will force the ball 65 to engage the next recession as the turret is rotated.

The opening 27 and the opening covered by the removable member 15 are slightly larger than the plate holder receiving openings. This is in order to allow the entire plate to be properly focused.

I will now describe a method of using the camera.

The camera is first focused on the object to be photographed. This is accomplished as follows:

The turret is rotated until the spring 66 forces the ball 65 into one of the recessions, thereby, preventing further rotation. I will assume that the plate holder receiving openings will then be in the position shown in Figs. 2, 4, and 5. A piece of ground glass contained in a suitable holder is inserted in the plate holder receiving opening 60. A suitable holder for the ground glass may be made by cutting the center out of a standard plate holder and inserting a ground glass in said plate holder. Plate holder receiving openings 61, 62, and 63 are left empty. The upper member 18 is then lowered into place and the snap lock 22 locked over protrusion 23, thereby making a light tight connection. The removable member 15 is then removed. The photographer then focuses the camera on the object by moving the lens support 29 longitudinally on the guide bar 12. As soon as the camera is focused, the set screw 31 is tightened, thereby preventing any further movement of the lens support with respect to the guide bar. The removable member 15 is then slid into place as shown in Fig. 1. The snap lock 22 is released and member 18 raised into the position shown in dotted lines in Fig. 2. The holder containing the ground glass is then removed and standard plate holders are inserted in plate holder receiving openings 60, 61, 62, and 63. Immediately after a standard plate holder is inserted in a plate holder receiving opening, the slide of the standard plate holder nearer to the lens 30 is pulled, so that the plate may be exposed when it is desired to do so. Standard plate holders are provided with shoulders which are adapted to engage the upper surfaces of member 41 when placed into said plate holder receiving openings. The turret is then rotated so that the plate holder receiving openings are again in the position shown in Figs. 2, 4 and 5. Member 18 is again lowered into place and snap lock 22 locked. The plate in plate holder receiving opening 60 is then exposed. The releasing lever 71 is then depressed which compresses spring 66 and releases the ball 65 from engagement with recession 67. The thumb knob 37 is then rotated in a clockwise direction until the ball 65 engages recession 68. The plate in plate holder receiving opening 61 is then exposed. The releasing lever 71 is then depressed which compresses spring 66 and releases the ball 65 from engagement with recession 68. The thumb knob 37 is then rotated in a clockwise direction until the ball 65 engages recession 69. The plate in plate holder receiving opening 62 is then exposed. The releasing lever 71 is then depressed which compresses spring 66 and releases the ball 65 from engagement with recession 69. The thumb knob 37 is then rotated in a clockwise direction until the ball 65 engages recession 70. The plate in plate holder receiving opening 63 is then exposed.

In taking color negatives suitable filters are placed either before the lens, or placed immediately in front of the plate holder receiving openings.

Although I have described my invention with respect to certain particular embodiments thereof, nevertheless I do not desire to be limited to the particular details shown and described except as clearly specified in the appended claims, since many changes, modifications and substitutions may be made without departing from my invention in its broader aspects and my invention in its broader aspects may be found useful in many other applications thereof.

I claim as my invention:

1. In a camera the combination of: a lens; bellows communicating with said lens; a turret housing communicating with said bellows; a rotatable turret in said turret housing, said turret being provided with a multiplicity of plate holder receiving openings; and a removable member in the side of said turret housing opposite the side communicating with the bellows.

2. A camera provided with a turret housing, said turret housing being open at one end thereof and having a member adapted to be opened at the other end thereof; and a rotatable turret provided with a multiplicity of plate holder receiving openings pivoted in said turret housing.

3. A camera provided with a turret housing, said turret housing being open at the end thereof communicating with the lens of said camera and having a member adapted to be opened at the opposite end thereof; and a rotatable turret provided with a multiplicity of plate holder receiving openings pivoted in said turret housing.

4. A camera provided with a turret housing, said turret housing being open at the end thereof communicating with the lens of said camera and having a member adapted to be opened at the opposite end thereof; means for varying the focal length of said camera; and a rotatable turret provided with a multiplicity of plate holder receiving openings pivoted in said turret housing.

In testimony whereof, I have hereunto set my hand at San Francisco, California, this 18th day of August 1931.

F. A. LATHE.